US006421729B1

United States Patent
Paltenghe et al.

(10) Patent No.: US 6,421,729 B1
(45) Date of Patent: Jul. 16, 2002

(54) SYSTEM AND METHOD FOR CONTROLLING TRANSMISSION OF STORED INFORMATION TO INTERNET WEBSITES

(75) Inventors: Cris T. Paltenghe, Northridge, CA (US); Lisa Ezrol, New York, NY (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/291,295

(22) Filed: Apr. 14, 1999

Related U.S. Application Data (60) Provisional application No. 60/081,748, filed on Apr. 14, 1998.

(51) Int. Cl.[7] .............................................. G06F 13/00
(52) U.S. Cl. ................................. 709/229; 709/213
(58) Field of Search ............................ 709/213, 223, 709/229; 345/335; 705/26; 395/200.57

(56) References Cited

U.S. PATENT DOCUMENTS

| 5,608,865 | A |   | 3/1997  | Midgely et al.   | 395/180    |
|-----------|---|---|---------|------------------|------------|
| 5,774,670 | A | * | 6/1998  | Montulli         | 395/200.57 |
| 6,101,482 | A | * | 8/2000  | DiAngelo et al.  | 705/26     |
| 6,112,240 | A | * | 8/2000  | Pogue et al.     | 709/224    |
| 6,134,592 | A | * | 10/2000 | Montulli         | 709/229    |
| 6,225,995 | B1| * | 5/2001  | Jacobs et al.    | 345/335    |
| 6,237,033 | B1| * | 5/2001  | Doeberl et al.   | 709/223    |

OTHER PUBLICATIONS

Article entitled "JavaScript Cookies," by C. B. Tichenor, *Dr. Dobb's Journal*, vol. 22, No. 5, pp. 42–45, May, 1997.
Article entitled "Thanks to a Cookie, Your Favorite Web Site Knows More About You Than You Think," by Tripp Reynolds, *Money Dailey*, Jan. 1997.
Article entitled "The New Cookie Monster," by Neil Randall, *PC Magazine*, Apr. 22, 1997.

* cited by examiner

*Primary Examiner*—David Wiley
(74) *Attorney, Agent, or Firm*—George T. Marcou; Kilpatrick Stockton LLP (57) ABSTRACT

A system and method for controlling the transmission of information known as "cookies" stored on electronic media to Internet websites accessed by PC users utilizes a "cookie jar" in a server-based virtual wallet for the user. When a website server sends a "cookie" to the user's PC, the virtual wallet stores the cookie only after requesting and receiving the user's permission. When the user accesses the website server again, and the server requests return of the cookie, the virtual wallet sends the cookie only after requesting and receiving the user's permission. Alternatively, the user can preconfigure the virtual wallet with predefined parameters for withholding or sending the cookie when requested by the website server.

32 Claims, 5 Drawing Sheets

SYSTEM AND METHOD FOR CONTROLLING TRANSMISSION OF STORED INFORMATION TO INTERNET WEBSITES

CROSS-REFERENCE TO RELATED APPLICATIONS

This application is related to U.S. Provisional Patent Application Ser. No. 60/081,748, entitled "Virtual Wallet System", filed Apr. 14, 1998; co-pending U.S. Utility patent application Ser. No. 09/190,993, entitled "Virtual Wallet System", filed Nov. 12, 1998; U.S. Utility Patent Application entitled "System and Method for Securely Storing Electronic Data", Ser. No. 09/291,294 filed Apr. 14, 1999; and, U.S. Utility Patent Application entitled "Digital Graphic Signature System", Ser. No. 09/290,427 filed Apr. 13, 1999; all of which are incorporated herein by reference.

FIELD OF THE INVENTION

This invention relates generally to Internet web-based client/server applications and, more particularly, to a system and method for controlling the transmission of information stored on electronic media to Internet websites accessed by consumers.

BACKGROUND

As the Internet has evolved, the purpose for maintaining a website has also evolved. Websites are now used not only to entertain those accessing them, but are also used as a vehicle to provide products, services, and information, in some instances in exchange for a fee. Thus, many website owners are now using their websites as a virtual store front or service counter. Interactions occurring at traditional service counters or in traditional stores involve personal contact that allows the owner or the owner's employees to identify customers visually, if not by name. Ideally, after a consumer has had a number of interactions with an owner, the owner is able to note the consumer's preferences and link those preferences to the consumer's identity. Linking customers' personal preferences to their identities allows store owners and service providers to remain competitive by allowing them to respond more quickly to their customers' needs.

Because website owners do not have personal contact with those accessing their websites, website owners require some means other than visual contact to identify their virtual customers. One mechanism that was developed to help website owners identify those accessing their sites is the cookie. A cookie is a small piece of software, usually no more than a few lines of text, that is deposited upon the hard drive of the personal computer (PC) accessing a website. PC's use HyperText Transfer Protocol (HTTP) to access websites on the world wide web portion of the Internet. An HTTP transaction involves a request by the individual PC attempting to access a website and a response issued by the website's server.

Generally, a software application resident on the PC, normally referred to as a browser, sends a request to a server and the server issues a response in which it returns a HyperText Markup Language (HTML) document to the PC's browser. The transfer of a cookie takes place as a part of the HTTP transaction process. The website server transmits a cookie to the PC's browser along with the rest of the HTML document requested (i.e., the web page accessed). The browser then stores the cookie on the individual PC's hard drive. Hence, the transfer of a cookie can be no more obvious than an HTML file download. In fact, cookies are meant to be invisible and are a means for website owners to gather information without bothering their website visitors.

Cookies are a general mechanism allowing servers at websites to store information on the hard drive of PC's that access their websites. A server can retrieve and thus make use of only those cookies it has sent. Normally, a server cannot access cookies placed by other servers. Thus, information inside a cookie usually includes the description of the range of Uniform Resource Locators URLs), or website addresses, which may access that cookie. Future HTTP URL requests made by a PC upon which a cookie is resident that fall within the range of URL's identified in the cookie include a transmittal of the cookie from the PC to the server. When a server retrieves a previously placed cookie, the server can update the information received and transmit an updated cookie back to the PC.

The type of information stored in a cookie can vary widely. For example, cookies are used by website owners to obtain an assortment of useful information about visitors to their website. In their simplest form, cookies can be used as a type of identification badge that is not personal. For example, a cookie may only report back to its server that a user identified by a number regularly views specific pages at the website. A cookie can keep a record of pages visited most frequently and how much time was spent on those pages. The kind of things normally written in a cookie include, for example, the visitor's ID in the website database or the pages most often visited previously or any number of other things that are useful to the website owner. Cookies indicate, for example, the last time the user visited the site, how often the user visited the site, what pages the user viewed, and what the user's interests are.

Cookies enable the website owner to respond quickly and efficiently to serve a multitude of user's of the website. For example, if a user visits a number of pages of the website in sequential order and stops at page number 25 of 45 pages, the next time the user visits the website, the cookie indicates where the user stopped and may ask the user if she wants to continue where she left off. Cookies enable a website owner to recognize its customers when they come back into the store and to provide them with some level of either custom service or personalized service in much the same way as a traditional service counter store.

Cookies are like notes to the website owner. A cookie lets the website owner write a note to itself and give it to the customer. Every time the customer returns to the website, she brings the note with her, and the website owner can read the note and determine what should be remembered about the customer from the note. The website owner can change what is stored in the note over time or give each customer a number of different notes, so the website owner can remember a number of different things about each customer.

Cookies can also be used to provide a more personalized world wide web browsing experience. For example, a website can request that the user fill out a form detailing the type of information the user prefers to retrieve each time she visits the particular website. The user's preferences are stored in a file maintained at the website server and linked to a specific cookie transmitted to the user's PC. The next time that particular PC accesses the website, the cookie transmitted to the website identifies the file containing the user's preferences so that only the information the user indicated was of interest is provided. Use of cookies in this manner frees users from retyping a user-ID during subsequent connections. When feasible, a website can store the user's preferences in a cookie. Then, the website can obtain the user's preferences each time the user accesses the website.

Websites offering a shopping basket to Internet shoppers may use cookies to retain information about items placed in the shopping basket. Cookies enable virtual customers to put items into their shopping basket, end their on-line session, and then see their basket as they left it when they return to the site. Cookies can also track how users navigate around a website, which pages they visit most frequently, how they enter those pages, and whether navigation can be made more efficient. For example, if a user has accessed a website having a number of sequential pages, a cookie can be used to note at which page in the sequence the user signed off and inquire if the user would like to continue where they left off during the next on-line session. Cookies can track this kind of information on a user-by-user basis.

Well designed cookies allow website owners to determine whether certain pages are launching points for users, or whether other pages typically cause users to head elsewhere on the web. Even a simple task like counting visitors can be enhanced through cookies. Absent information contained in a cookie, a typical counter cannot determine how many individual users have visited a site or how many of the total hits are repeat visits. In a sense, cookies allow website owners to write a note to themselves and give it to their visitors. Then, every time the user returns to the website, the owner can retrieve the note and identify the visitor and their preferences.

Currently, users can only control whether they will accept a cookie from a website and have no control over the distribution of cookies resident on their PC hard drives. Internet browsers can be configured to request the consumer's permission to accept an offered cookie. By default, browsers are configured to accept cookies from websites without asking the consumer for permission. Many consumers do not configure their browser to inquire whether the user will accept cookies offered because they are unaware of their ability to do so. Others do not configure their browsers because the browsing experience becomes too cumbersome as many websites regularly attempt to send dozens of cookies during transmission of a single HTML document.

Even if consumers configure their browsers to request permission before accepting a cookie, once a cookie is accepted, consumers currently have no control over the dissemination of information stored in cookies on their PCs' hard drives. Although the client side of the browser allows the visitor to decide whether she wants the cookie or not in the first place, once a cookie is there, there is nothing that prevents the cookie from being retrieved.

SUMMARY OF THE INVENTION

It is a feature and advantage of the present invention to provide PC users with the ability to manage the flow and content of information in cookies in order to protect the privacy of the information contained in storage areas of their PC's.

It is a further feature and advantage of the present invention to provide online customers with the ability to control where a cookie will be stored and, specifically, to provide consumers with the ability to protect the privacy of information contained in cookies.

It is another feature and advantage of the present invention to provide consumers with the ability to control the dissemination of cookies resident on electronic storage media.

It is an additional feature and advantage of the present invention to allow consumers to assign hierarchical levels of privacy to different types of information contained in cookies and control dissemination of the cookies by the assigned privacy values.

It is still another additional feature and advantage of the present invention to allow consumers to monitor and meter information that merchants, i.e., websites, take and leave in the form of cookies.

It is still a further feature and advantage of the present invention to permit consumers to realize the value of information contained in cookies in the electronic wallets or on their PC hard drives, for example, by requiring compensation for access to information contained in their cookies.

To achieve the stated and other features, advantages, and objects of the present invention, an embodiment of the present invention provides a system and method for controlling transmission of stored data to an Internet website server utilizing a "cookie jar" in an electronic or virtual wallet. In an embodiment of the present invention, the system stores the data for the website server when a user accesses the website. At a later time, when the user again accesses the website, the system of the present invention receives a request from the web server for transmission of the stored data to the website server. The system of the invention generates or forms a decision regarding a response to the request and automatically executes the decision regarding the response to the request.

In an embodiment of the present invention, storing the data involves accessing the website server by the user at a terminal, such as a personal computer with a browser application. When the website server is accessed by the user over the Internet, the website server sends the data to the browser application, which forwards the data to the virtual wallet application for the user. The virtual wallet application, which is server based, requests permission of the user to store the data by automatically prompting the user at the terminal for the permission. The user enters a decision at the terminal to either withhold permission or grant permission. If the user grants permission to store the data, the data is automatically stored by the virtual wallet application.

When the user again accesses the same website server, the website server sends a request for transmission of the stored data, which is received by the virtual wallet application for the user. The virtual wallet application automatically generates or forms a decision by prompting the user at the terminal for the user's decision regarding a response to the request from the website server. The user enters a decision at the terminal either denying the request or granting the request.

In an embodiment of the present invention, alternatively, the user can preconfigure the virtual wallet application with at least one predefined parameter for the decision regarding the response to the request. The predefined parameter is, for example, a parameter relating to the information contained in the stored data, such as the user's name and/or address, or, for example, a parameter relating to the identification of the website server requesting transmission of the stored data. The preconfigured virtual wallet application automatically generates or forms a decision for the user based at least in part on one or both of the predefined parameters. In other words, the virtual wallet application automatically generates or forms a decision for the user either withholding or sending the stored data to the website server based at least in part on one or both of the parameters.

The decision regarding the response is automatically executed by the virtual wallet application for the user by automatically sending the response to the website server either denying the request and withholding the stored data or granting the request and sending the stored data to the website server. The system includes a terminal, such as the user's personal computer, with a browser application, which is used to access the website server, as well as a server-based electronic or virtual wallet application communicating with the user's PC, for example, over a network such as the Internet.

Additional objects, advantages, and novel features of the invention will be set forth, in part, in the description that follows, and, in part, will become more apparent to those skilled in the art upon examination of the following, or may be learned by practicing the invention.

DETAILED DESCRIPTION

Referring now in detail to an embodiment of the invention, an example of which is illustrated in the accompanying drawings, the present invention provides a system and method for controlling the transmission of information stored on electronic media to Internet websites accessed by consumers. The present invention provides a PC user with a certain degree of control, for example, over the manner in which cookies stored on their PC hard drive are distributed. Additionally, an embodiment of the present invention enables the PC user to build a certain level of intelligence into the user's browser.

As used herein, a cookie is a piece of information that a server can deposit on a device accessing the server. For example, a website server may deposit a cookie on the computer of a browser user who is accessing the website. The cookie contains information the user has given to the website, such as information on a form filled out to access the site. Typically, only the server that deposited the cookie can access the information on the cookie. The system and method of the present invention, referred to herein as the cookie jar, provides PC users/owners with the ability to protect the privacy of information in the cookie and/or realize the value of the information.

The system and method for an embodiment of the present invention also manages the flow and content of information in cookies. For example, the system of the present invention can allow a cookie to be added freely if the PC user can read and approve the data that is to be stored on her hard drive. Similarly, this feature of the system of the present invention advantageously allows information contained in the cookie to be removed, but with some condition, such as approval by the PC user.

In addition, the PC user can establish policies for different levels of information such that some information may be removed without prompting the PC user. Further, because information in cookies has some value, PC users may require some form of compensation for the removal of information in a cookie. Thus, the system and method of the present invention monitors and meters the information in cookies that merchants take and leave.

The system for an embodiment of the present invention makes use of application software, such an electronic or virtual wallet, and the cookie jar which resides in the electronic or virtual wallet for an embodiment of the present invention. An electronic wallet is an embodiment of software acting as a container, for example, for payment mechanisms, identity authentication mechanisms, personal information, and electronic artifacts of the owner. An electronic wallet can reside, for example, on a consumer's PC, on a server, or on a smart card.

Currently, many electronic wallets focus on payment mechanisms. However, electronic wallets can also be used to maintain identification information, credit card account information, customer loyalty program information, personal information managers, site profile repositories, calling cards, and agent profiles, as well as other payment mechanisms (e.g., debit card information). For a detailed discussion of an electronic wallet, see, for example, currently co-pending and co-owned provisional application Ser. No. 60/081,748 filed on Apr. 14, 1998, incorporated herein by reference. Information stored in an electronic wallet can be transmitted and received by the owner of the electronic wallet, for example, through the Internet or other types of networks in the form of cookies.

The system and method for an embodiment of the present invention enables the PC user to specify, for example, that any cookie offered by the website of a particular entity, such as the user's bank, can be accepted, and any time that the website of the particular entity asks for the cookie, the cookie can be given back to the entity. On the other hand, for websites of entities with which the PC user does not want as much information exchanged, the user can specify that for any cookie offered by the particular website, the user's permission must first be requested.

Further, the system and method of the present invention allows the PC user to specify, for example, if the cookie offered by a particular website has the user's ID on it, the user's permission must be requested, but if the cookie does not have the user's ID on it, permission is not required. The system and method of the present invention provides a value added service for PC users in terms of privacy and data protection, and allows the users to decide what level of data protection they want to have.

Figure 1:
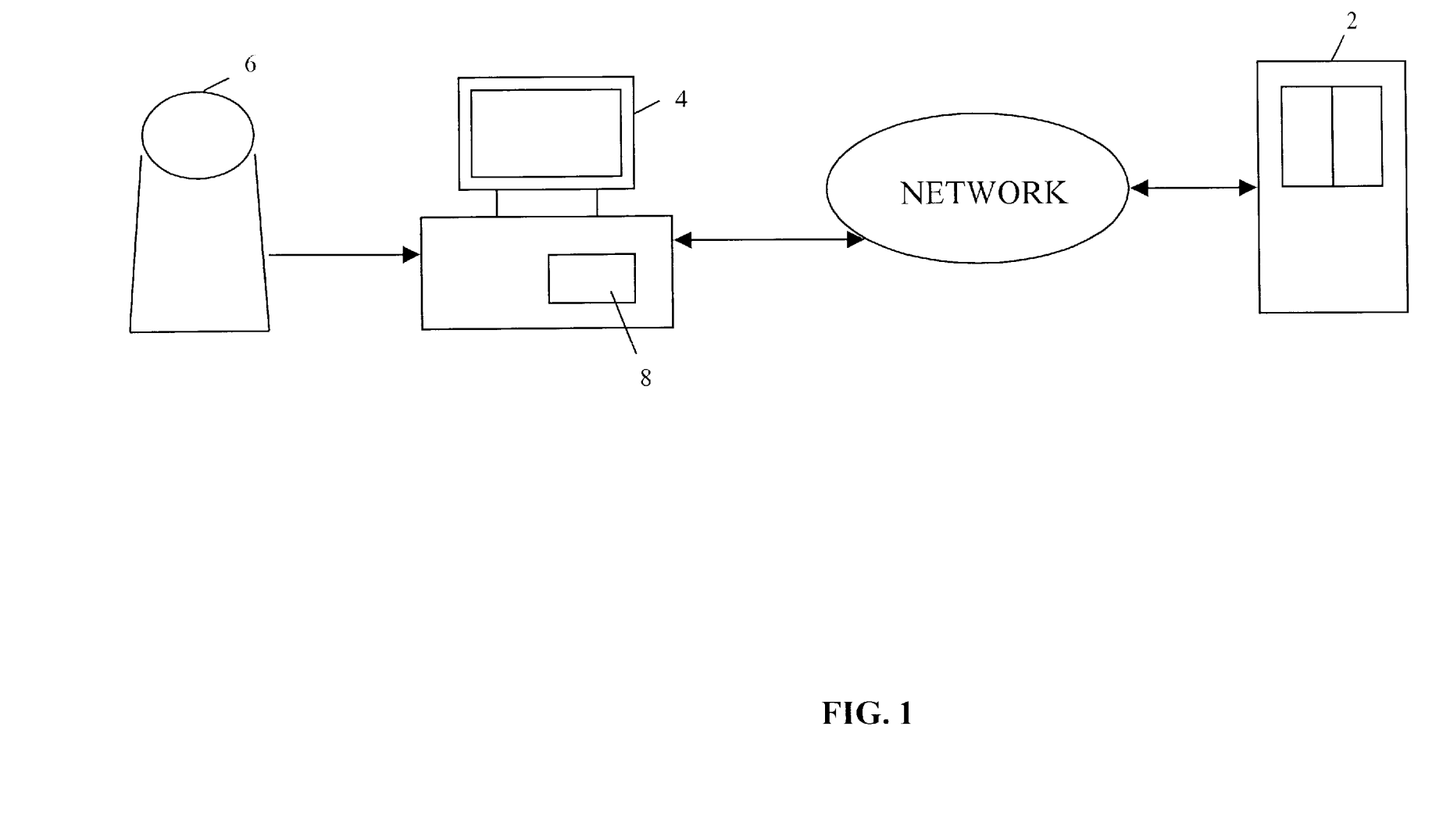
FIG. 1 shows an overview of key components and the flow of information between the key components of a typical prior art interaction between a website and a PC with a browser.

Currently, cookies are stored in a plain text file on the hard drive of the user's PC, where the browser software is installed. Typically, the browser can be configured by the PC user, for example, to ask the user for permission before accepting a cookie. FIG. 1 shows an overview of key components and the flow of information between the key components of a prior art interaction between a PC with a browser and a website server. A typical cookie interaction involves a web server 2 for the website and a user's computer or PC 4. When the user 6 at her PC 4 goes to the website, if the web server 2 wants to write a cookie, it contacts the browser 8 on the user's PC and sends the cookie to the browser. If the browser 8 is not configured by the user 6, the cookie is automatically stored on the user's PC 4 by the web server 2. If the browser 8 is configured, the configured browser on the user's PC 4 then asks the user 6 whether it is okay to accept the cookie, and the user answers either yes or no. If the user answers yes, the data is written to the user's PC 4 by the web server 2.

Figure 2:
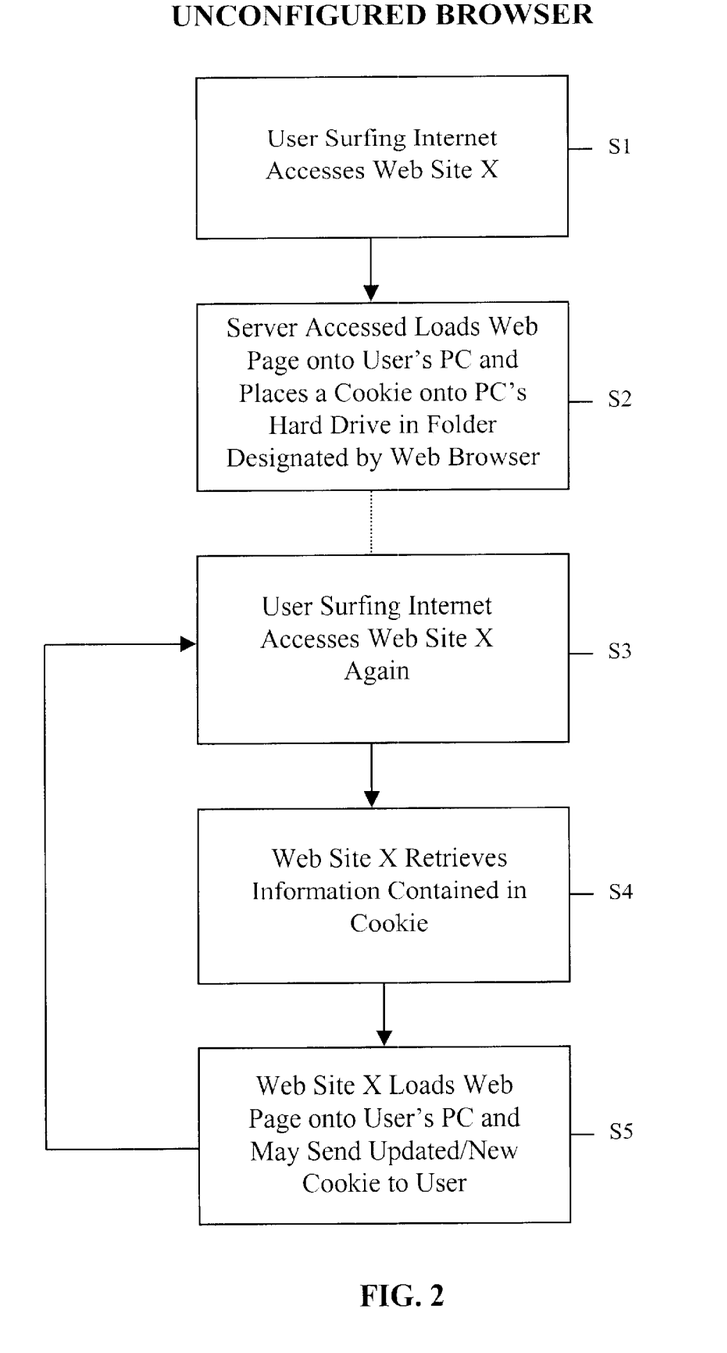
FIG. 2 is a flow chart which amplifies the flow of information shown in FIG. 1 and provides further detail regarding the prior art interaction between the website server and the PC with an unconfigured browser.

FIG. 2 is a flow chart which amplifies the flow of information shown in FIG. 1 and provides further detail in the prior art interaction between the website server 2 and the user's PC 4 with an unconfigured browser 8. At S1, the user 6 surfing the Internet accesses the website. At S2, the accessed website server 2 loads a web page onto the user's PC 4 and places a cookie on the hard drive of the user's PC in a folder designated by the browser 8. At a later time, at S3, when the user 6 returns to the website, the website server 2 retrieves the information contained in the cookie from the user's PC 4. At S4, the website server 2 loads the web page onto the user's PC 4 and may send a new cookie or an updated cookie to the user's PC4.

Figure 3:
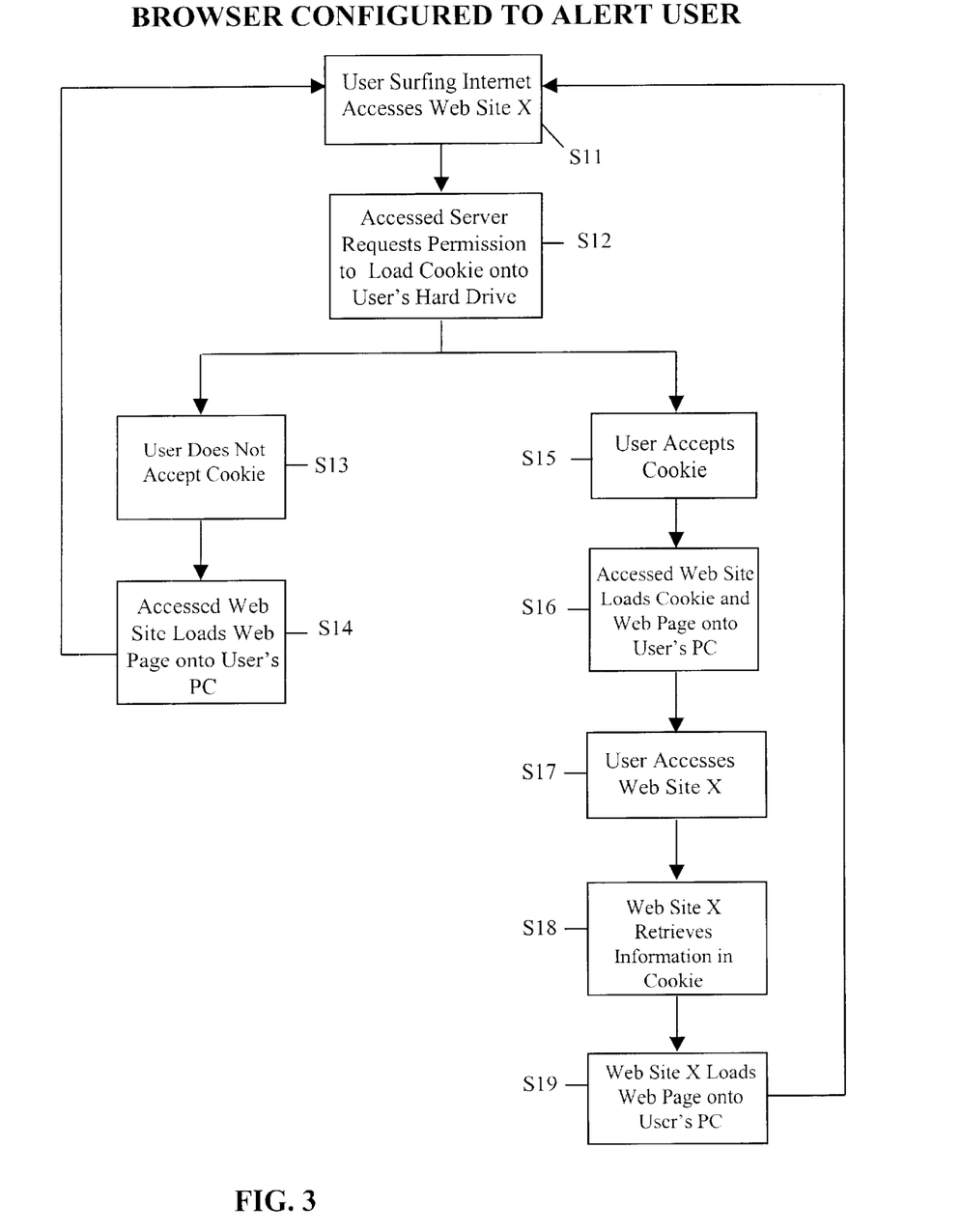
FIG. 3 is a flow chart which amplifies the flow of information shown in FIG. 1 and provides further detail in regarding the prior art interaction between the website server and the PC with the browser configured to ask for the user's permission before accepting a cookie.

FIG. 3 is a flow chart which amplifies the flow of information shown in FIG. 1 and provides further detail in the prior art interaction between the website server 2 and the user's PC 4 with the browser 8 which is configured by the user 6 to ask for permission before accepting a cookie. At S11, the user 6 accesses the website. At S12, the accessed website server 2 requests permission to load a cookie in the hard drive of the user's PC 4. At S13, if the user 6 does not accept the cookie, the accessed website server 2 does not place a cookie on the hard drive of the user's PC 4, and at S14, the website server loads the web page onto the user's PC 4. When the user 6 returns to the same website, the user is treated by the website server 2 as a first time visitor, and the process is repeated.

Referring further to FIG. 3, alternatively, at S15, if the user 6 accepts the cookie, the accessed website server 2 loads the cookie and the web page onto the user's PC 4 at S16. At a later time, when the user 2 returns to the website at S17, the website server 2 wants to know what cookies it has stored on the user's PC 4. The web server 2 asks the browser 8 on the user's PC 4 to give its cookies back. The web server 2 asks for the name of the cookie it wants back, and the cookie is sent back automatically by the browser 8 on the user's PC 4 at S18, and the website server 2 loads the web page onto the user's PC 4 at S19. Thus, while the PC user 6 can configure her browser not to accept cookies without asking the user for permission, the user has no control over cookies after they are accepted.

Figure 4:
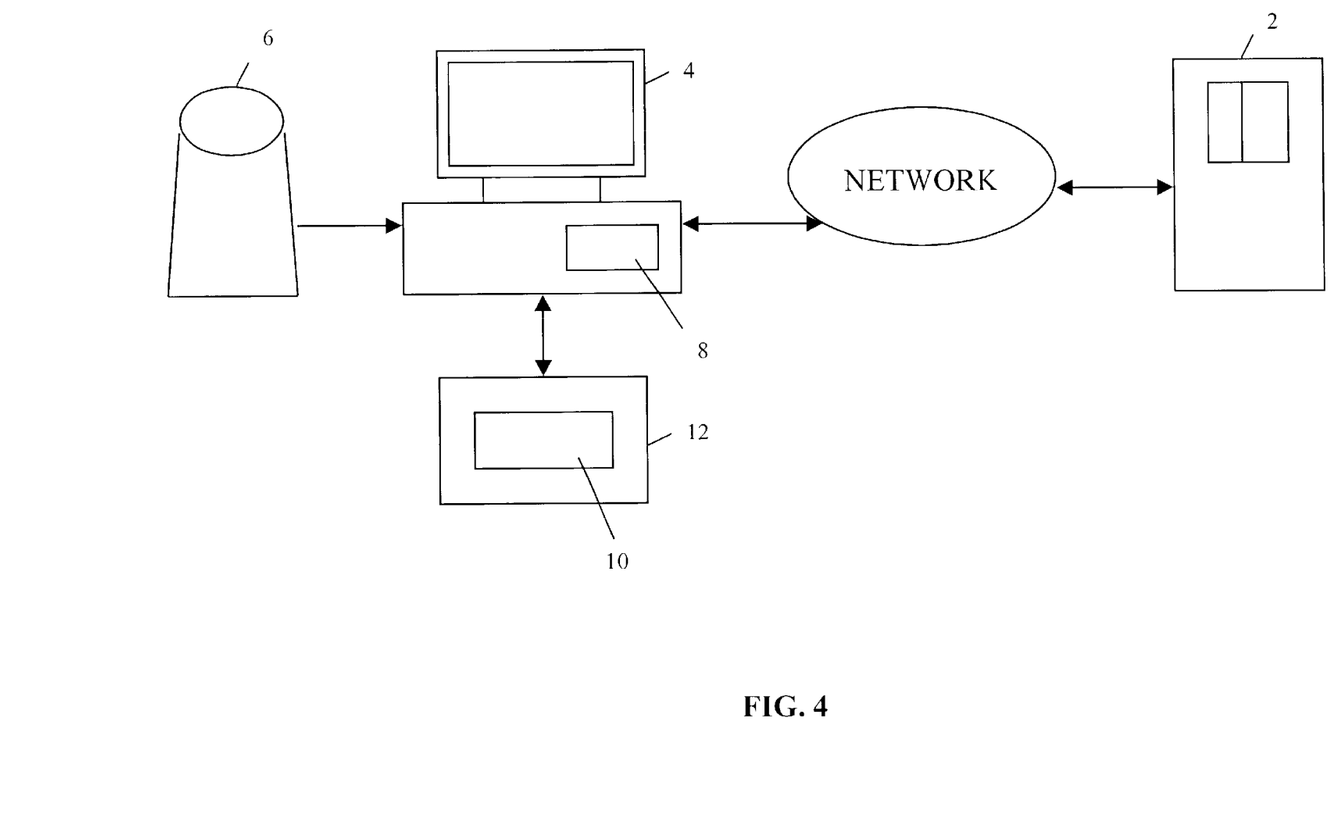
FIG. 4 shows an overview of key components and the flow of information between the key components for an embodiment of the present invention.

FIG. 4 shows an overview of key components and the flow of information between the key components of an interaction between the website server 2 and the user's PC with the cookie jar 10 for the method and system for an embodiment of the present invention. According to the present invention, instead of writing cookies to the hard disk of the user's PC 4 on which the user's browser 8 is installed, the cookies are stored, for example, in the user's electronic wallet 12. Thus, when the PC user 6 goes to a website, and the web server 2 asks if it can give the user a cookie and the user assents, the cookie is sent by the web server to the browser 8 on the user's PC 4, but is forwarded to the user's electronic wallet 12.

The system and method of the present invention stores the cookie in the secure data store of the electronic or virtual wallet 12, with all the other electronic information likewise stored in the electronic wallet. The electronic wallet 12 is, for example, a server-based wallet so that the cookie is available wherever the electronic wallet is available. Thus, the cookie is sent to and stored in the PC user's electronic wallet 12, rather than being written on the hard drive of the user's PC 4 where the user's browser 8 is installed.

Figure 5:
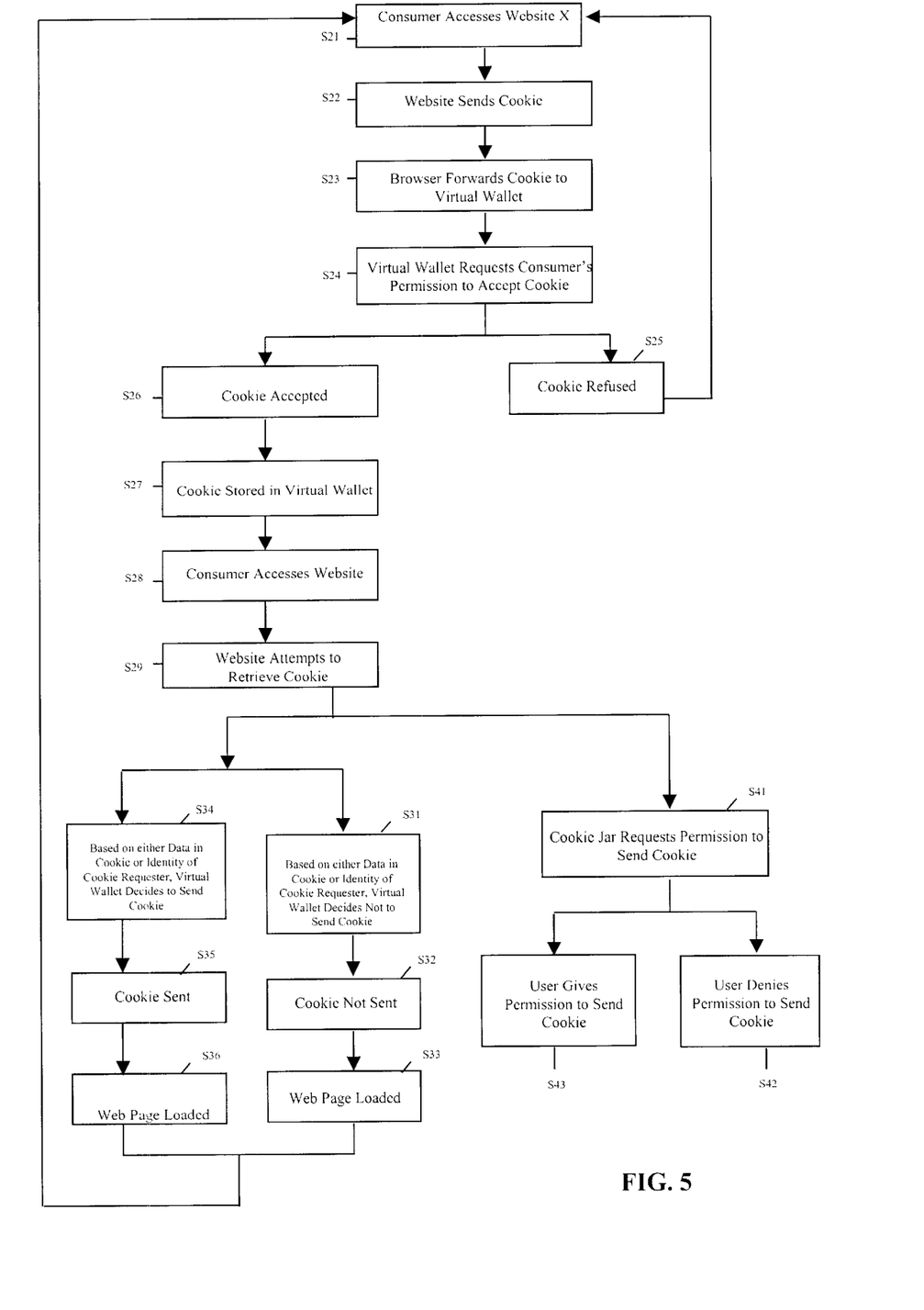
FIG. 5 is a flow chart which amplifies the flow of information shown in FIG. 4 and provides further detail regarding the process of an interaction between the website server and the PC with a cookie jar in an electronic or virtual wallet for an embodiment of the present invention.

FIG. 5 is a flow chart which amplifies the flow of information shown in FIG. 4 and provides further detail regarding an interaction between the website server 2 and user's PC 4 with the browser 8 and the cookie jar 10 in the electronic wallet 12. At S21, the user 6 accesses the website, and at S22, the website server requests permission to write data to the cookie storage on the user's PC 4. At S23, the request is passed from the browser 8 to the cookie jar 10, which resides in the electronic or virtual wallet 12, and the virtual wallet asks the user 6 if it is okay for the particular website server to store a cookie. The user 6 makes a decision as to whether or not the cookie will be received, and at S25, if the user 6 refuses permission, the website server 2 simply loads the web page onto the user's PC 4. When the user 6 returns to the same website, the website server 2 treats the user as a first time visitor, and the process is repeated.

Referring further to FIG. 5, alternatively, at S26, if the user 6 accepts the cookie, the cookie data is sent by the web server 2 to the browser 8 on the user's PC 4. At S27, the browser forwards the cookie data to the virtual or electronic wallet 12, which stores the cookie data in the cookie jar 10 resident in the electronic wallet. At S28, when the user 6 returns to the website, the web server 2 requests that its cookie be returned at S29. However, the cookie is not automatically returned. Instead, the user 6 controls whether or not the cookie is returned to the website server 2. The way that decision is made is determined in the system of the present invention with the cookie in the electronic or virtual wallet 12. The user's control over the cookie is exercised by the user 6 either authorizing or denying permission for the cookie to be returned.

Referring again to FIG. 5, if the cookie jar 10 is not preconfigured by the user 6, at S41, the cookie jar asks the user whether it is okay to send the cookie. Depending on whether the user 6 grants or refuses permission, the cookie is or is not returned to the website server 2. On the other hand, the user 6 can preconfigure the cookie jar 10 to allow full access to the cookie jar by a particular website server, such as the user's bank, in which case the user will not even be asked, and the cookie is automatically sent by the cookie jar to the particular website server. However, the user 6 can also preconfigure the cookie jar 10 to never allow access to the cookie jar by a particular website server, in which case the user likewise will not be asked, and the request will simply be flatly denied.

Alternatively, the user 6 can preconfigure the cookie jar 10 to notify the user when a particular website server requests return of a cookie that contains information of a predefined nature and to ask the user if she wants the cookie to be released. The user 6 can likewise answer yes or no and grant or deny the website's request for return of the cookie. Depending upon how the user 6 configures her electronic wallet 12 and the cookie jar 10 within the electronic wallet to behave, there are numerous other possible options for the manner in which the cookie information is sent back and forth.

An embodiment of the system and method of the present invention involves a set of intelligence leading up to the yes or no answers. Depending on the particular website and depending on the nature of the information that is being exchanged, different users have different preferences as to how often they want to actually be asked whether to release a cookie. For example, if the information in the cookie happens to include the user's name and address, the user 6 may be very sensitive about where her name and address information is sent. On the other hand, the user 6 may not be very sensitive if the information in the cookie is only the user's ID number for a specific website.

The system and method of an embodiment of the present invention has the ability built inside the interaction of the decision for the user 6 to configure the cookie jar 10 never to release certain kinds of information, such as the user's name and address, without asking the user. Likewise, the user 6 can configure the cookie jar 10 so that when she logs onto, for example, her bank's website, the cookie jar does not need to ask the user for permission to release information.

In an embodiment of the present invention, the system provides, for example, for preconfiguring the cookie jar 10 with two sets of controls. One set of controls enables the user 6 to preconfigure the cookie jar 10, for example, based on the data that is within the cookie. Thus, when the website server 2 requests return of a cookie, the cookie jar 10 reads all the data in the cookie and makes a value judgment based on that data whether or not to release the cookie. Another set of controls enables the user 6 to preconfigure the cookie jar 10, for example, based on who is asking for the data in the cookie. Thus, the cookie jar's decision whether or not to release the cookie is not necessarily based on what is inside the data, but simply where the information is going to be sent. The cookie jar 10 can manage both dimensions of concern.

Referring once again to FIG. 5, if the cookie jar 10 is preconfigured by the user 6 to make a decision whether or not to release a cookie without interaction between the user and the cookie jar based on data inside the cookie or the identity of the website requesting the cookie, at S31, the cookie jar reads the data inside the cookie and/or identifies the website and makes a decision not to release the cookie. At S32, the cookie jar 10 denies the request to release the cookie, and the web page is loaded at S33. Alternatively, at S34, the cookie jar, upon reading the data inside the cookie and/or identifying the requesting website, makes a decision to release the cookie. At S35, the cookie jar 10 sends the cookie to the website server 2, and the web page is likewise loaded at S36.

In an embodiment of the present invention, when the user 6 returns to a website which has previously been allowed to store a cookie in the user's cookie jar 10, if a decision is made not to release the cookie, the website server 2 assumes that the user is a new user and displays, for example, a new user screen on the user's PC 4. Thus, the user 6 can choose whether or not to release the cookie and can set conditions for release of the cookie. For example, the user 6 can set the condition for release of a cookie stored in the user's cookie jar 10 as being real-time approval, and if there is an unusually long cookie that has the user's name in it, user is presented with a dialogue box which says that the cookie that contains the user's name will be sent to the particular website. The user 6 can respond with either a yes or no answer to either allow or deny permission to send the cookie to the website.

Various preferred embodiments of the invention have been described in fulfillment of the various objects of the invention. It should be recognized that these embodiments are illustrative of the principles of the present invention. Numerous modifications and adaptations thereof will be readily apparent to those skilled in the art without departing from the spirit and scope of the present invention. Accordingly, the invention is limited only by the following claims.

What is claimed is:

1. A method for controlling transmission of stored data to an Internet website server, comprising:
storing the data in the form of cookie information for the website server in a secure data store of a virtual wallet application via a browser application in communication with the website server;
receiving a subsequent request by the virtual wallet application from the website server via the browser application for transmission of the stored data to the website server;
forming a decision by the virtual wallet application regarding a response to the request according to a set of predefined criteria for releasing the stored data based at least in part on one of a content of the data within the stored cookie information and an identification of the website server storing and requesting the data in the stored cookie information; and
automatically executing the decision by the virtual wallet application to release the stored data via the browser application if the predefined criteria are met and refusing the request upon failure to meet the predefined criteria.

2. The method of claim 1, wherein storing the data further comprises accessing the website server by a user at a terminal.

3. The method of claim 2, wherein the terminal further comprises a personal computer running the browser application.

4. The method of claim 2, wherein accessing the website server further comprises accessing the website server over a network.

5. The method of claim 4, wherein the network further comprises the Internet.

6. The method of claim 3, wherein accessing the website server further comprises sending the data by the website server.

7. The method of claim 3, wherein sending the data by the website server further comprises sending the data to the browser application.

8. The method of claim 7, wherein sending the data to the browser application further comprises forwarding the data by the browser application to the virtual wallet application for the user.

9. The method of claim 8, wherein the virtual wallet application further comprises a server-based virtual wallet application.

10. The method of claim 8, wherein forwarding the data to the virtual wallet application further comprises requesting permission of the user by the virtual wallet application to store the data.

11. The method of claim 10, wherein requesting the permission of the user further comprises automatically prompting the user at the terminal for the permission by the virtual wallet application.

12. The method of claim 11, wherein prompting the user for permission further comprises entering a decision by the user at the terminal regarding the request for permission to store the data.

13. The method of claim 12, wherein entering the decision by the user further comprises entering the decision by the user granting the permission.

14. The method of claim 13, wherein entering the decision granting the permission further comprises storing the data by the virtual wallet application.

15. The method of claim 1, wherein receiving the request for transmission of the stored data further comprises accessing the website server by a user at a terminal.

16. The method of claim 15, wherein accessing the website server further comprises accessing the website server over a network.

17. The method of claim 16, wherein the network further comprises the Internet.

18. The method of claim 15, wherein accessing the website server by the user further comprises sending the request for transmission by the website server.

19. The method of claim 18, wherein sending the request by the website server further comprises receiving the request by the virtual wallet application via the browser application for the user.

20. The method of claim 1, wherein forming the decision regarding the response to the request further comprises receiving the request by the virtual wallet application via the browser application for a user.

21. The method of claim 1, wherein executing the decision by the virtual wallet application to release the stored data via the browser application if the predefined criteria are met further comprises automatically prompting the user at a terminal by the virtual wallet application for permission to execute the decision for releasing the stored data.

22. The method of claim 21, wherein the terminal further comprises a personal computer.

23. The method of claim 1, wherein forming the decision further comprises automatically generating the decision by the virtual wallet application for the user denying the request based on the predefined criteria relating to the content of the data within the stored cookie information.

24. The method of claim 1, wherein forming the decision further comprises automatically generating the decision by the virtual wallet application for the user denying the request based on the predefined criteria relating to the identification of the website server storing and requesting transmission of the stored data.

25. The method of claim 1, wherein forming the decision further comprises automatically generating the decision by the virtual wallet application for the user granting the request based on the predefined criteria relating to the content of the data within the stored cookie information.

26. The method of claim 1, wherein forming the decision further comprises automatically generating the decision by the virtual wallet application for the user granting the request based on the predefined criteria relating to the identification of the website server storing and requesting transmission of the stored data.

27. The method of claim 1, wherein automatically executing the decision further comprises automatically sending the stored data to the website server by the virtual wallet application for a user via the browser application if the predefined criteria are met.

28. The system of claim 1, further comprising a terminal communicating with the virtual wallet application.

29. A system for controlling transmission of stored data to an Internet website server, comprising:

a virtual wallet application with a secure data store capable of storing the data in the form of cookie information for the website server via a browser application in communication with the website server;

wherein the virtual wallet application is preprogrammed, upon receiving a request for transmission of the stored data to the website server, for forming a decision regarding a response to the request according to a set of predefined criteria for releasing the stored data based on at least one of a content of the data within the stored cookie information and an identification of the website server storing and requesting the data in the stored cookie information and for automatically executing the decision to release the stored data via the browser application if the predefined criteria are met and refusing the request upon failure to meet the predefined criteria.

30. The system of claim 29, wherein the virtual wallet application further comprises a server-based virtual wallet application.

31. The system of claim 28, further comprising the terminal communicating with the website server.

32. The system of claim 31, wherein the virtual wallet application further comprises a server-based virtual wallet application.

* * * * *